No. 771,574. PATENTED OCT. 4, 1904.
S. M. RENN.
STEAM COOKER.
APPLICATION FILED DEC. 3, 1902.
NO MODEL.
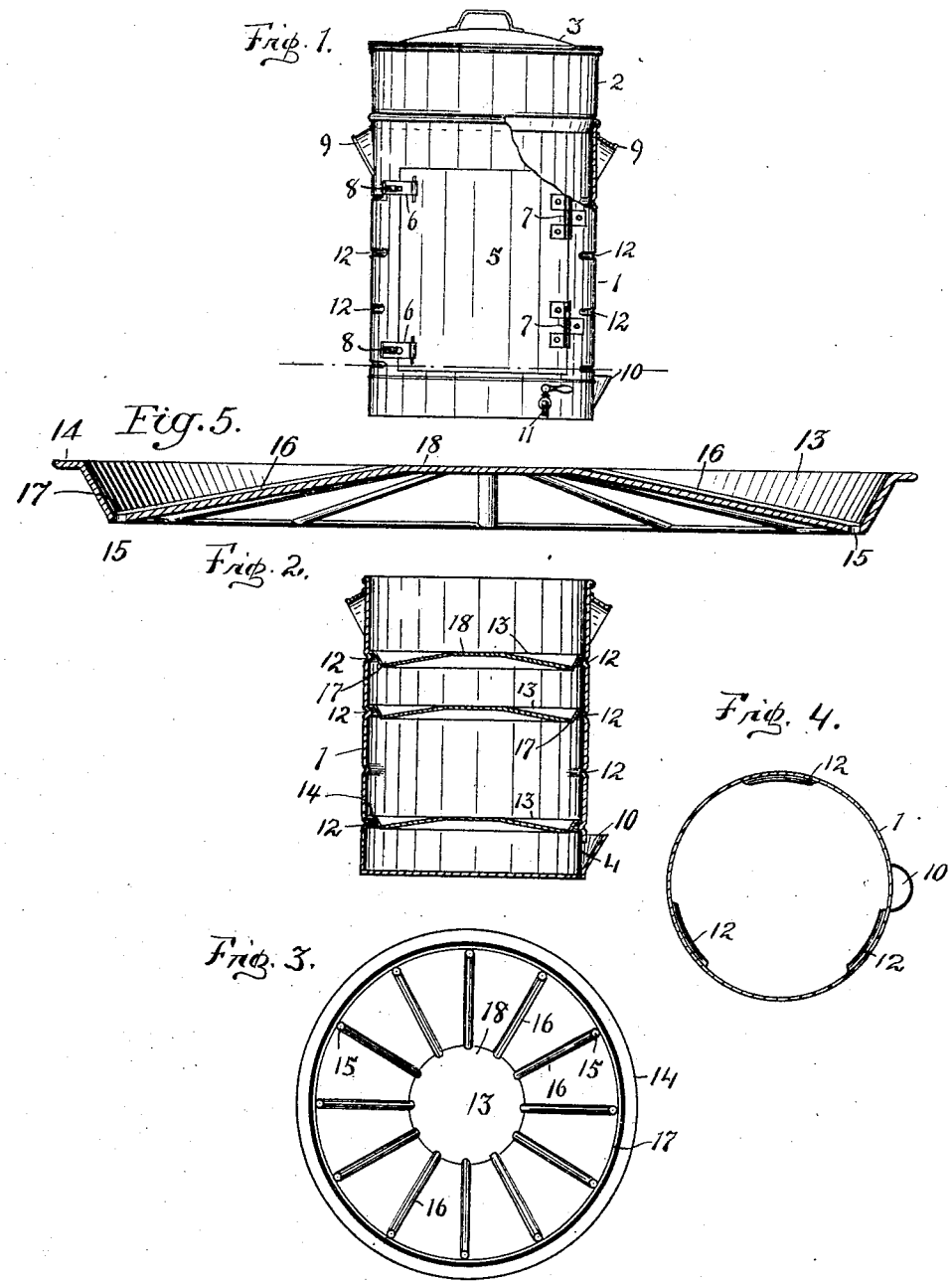

No. 771,574.

Patented October 4, 1904.

UNITED STATES PATENT OFFICE.

SAMUEL M. RENN, OF SPENCERVILLE, INDIANA.

STEAM-COOKER.

SPECIFICATION forming part of Letters Patent No. 771,574, dated October 4, 1904.

Application filed December 3, 1902. Serial No. 133,652. (No model.)

*To all whom it may concern:*

Be it known that I, SAMUEL M. RENN, a citizen of the United States, residing at Spencerville, in the county of Dekalb and State of Indiana, have invented certain new and useful Improvements in Steam-Cookers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in steam-cookers; and the object thereof is to afford means to prevent the food when placed in the apparatus from becoming soaked with condensed steam.

I accomplish my object by the construction illustrated in the accompanying drawings, in which—

Figure 1 is an elevation partly cut away. Fig. 2 is a vertical section of the steam-chamber. Fig. 3 is a plan showing one of the horizontal partitions. Fig. 4 is a cross-section of the steam-chamber, the section being in a plane indicated by the dotted line of Fig. 1; and Fig. 5 is a cross-sectional view, on an enlarged scale, of one of the partitions.

Similar numerals of reference indicate corresponding parts throughout the several views, and referring now to the same, 1 is a vertical cylindrical steam-chamber, and 2 is a cylindrical vessel arranged to fit in the top of the steam-chamber, and thereby close its upper end. The said vessel is provided with a lid 3, which is of a size suitable to fit the top of the steam-chamber and close the same when the vessel 2 is not used. A door 5 is attached, by means of hinges 7, to the steam-chamber, and latches 6, attached to the door, are adapted to engage the eyes 8, and thereby hold the door in its closed position. The lower part of the steam-chamber is adapted to contain a quantity of water, and an opening 4 is made in said chamber to afford communication with the spout 10, arranged upon the outer side thereof. A number of shoulders 12 are made to extend inwardly in the chamber 1 to support the partitions 13 horizontally therein. Each partition 13 is formed with an outer flange 14 and has an annular gutter 17 bordering the inner edge of said flange. An annular series of holes 15 is made in the partition along the lowermost part of said gutter. The central part of the partition is elevated and is flat and forms a plane 18, upon which a vessel of food is adapted to be placed. Radial channels 16 extend from said plane downwardly to said gutter, the lower ends thereof coinciding with the holes 15.

In the operation of my invention a quantity of water is fed through the spout 10 into the lower part of the chamber 1, and the chamber is placed upon a stove to generate steam within the chamber. Vessels of food are placed centrally upon the partitions 13, and the door 5 is then closed. As the steam condenses upon said vessels and partitions it gravitates toward the gutters along the channels 16 upon the upper and lower sides of the partitions. The holes 15 allow the collected water to pass downward to the lower part of the chamber, where it is regenerated into steam. By causing the condensed steam to flow outward to the gutters it is prevented from dropping into the vessels of food on the partitions beneath, thus avoiding unnecessary wetting the food. I have shown a spigot 11 at the lower end of the chamber 1 for drawing off the water therefrom. The vessel 2 affords a convenient means of keeping food warm without danger of burning it.

Having described my invention, what I claim as new, and desire to secure by Letters Patent, is—

1. In a steam-cooker, a steam-chamber adapted to contain water in its lower part having shoulders extending inward in the chamber; a vessel adapted to fit in the top of the chamber and close the same; and one or more partitions adapted to range horizontally within the chamber and rest upon said shoulders respectively, each of said partitions having a central raised portion, and an upwardly and outwardly extending flange forming an annular gutter, said raised portion being provided with radial channels leading to said gutter, and said gutter being provided with holes.

2. In a steam-cooker, a steam-chamber; and one or more horizontal partitions arranged in said chamber, each having an annular gutter near its edge, and radial channels leading downwardly and outwardly from the central plane thereof to its gutter, and having also one or more holes leading from its gutter.

In testimony whereof I affix my signature in presence of two witnesses.

SAMUEL M. RENN.

Witnesses:
WALTER G. BURNS,
WILMER LEONARD.